United States Patent
Sorrentino

(10) Patent No.: US 10,284,393 B2
(45) Date of Patent: May 7, 2019

(54) RECEIVER AND METHOD FOR ESTIMATING LARGE-SCALE CHANNEL PROPERTIES

(71) Applicant: Telefonaktiebolaget LM Ericsson (publ), Stockholm (SE)

(72) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 73 days.

(21) Appl. No.: 15/024,322

(22) PCT Filed: Sep. 27, 2013

(86) PCT No.: PCT/SE2013/051121
§ 371 (c)(1),
(2) Date: Mar. 23, 2016

(87) PCT Pub. No.: WO2015/047141
PCT Pub. Date: Apr. 2, 2015

(65) Prior Publication Data
US 2016/0241420 A1  Aug. 18, 2016

(51) Int. Cl.
*H04L 25/02* (2006.01)
*H04W 56/00* (2009.01)
(Continued)

(52) U.S. Cl.
CPC ....... *H04L 25/0228* (2013.01); *H04B 7/2612* (2013.01); *H04L 25/03* (2013.01);
(Continued)

(58) Field of Classification Search
CPC ............ H04L 25/0228; H04W 56/002; H04W 56/0015; H04W 84/12
(Continued)

(56) References Cited

U.S. PATENT DOCUMENTS 6,765,969 B1    7/2004  Vook et al.
8,036,691 B2 *  10/2011  Kim .................. H04B 7/022
                                                    455/272

(Continued)

FOREIGN PATENT DOCUMENTS

EP    3145109 A1    3/2017

OTHER PUBLICATIONS

3GPP TR 22.803 V12.0.0 "Technical Specification Group Services and System Aspects; Feasibility study for Proximity Services (ProSe) (Release 12)" (40 pages) (Dec. 2012).
(Continued)

*Primary Examiner* — Rasheed Gidado
(74) *Attorney, Agent, or Firm* — Patent Portfolio Builders, PLLC

(57) ABSTRACT

A receiver and a method performed by the receiver for estimating first large-scale channel properties associated to a first channel of a first transmitter and a second large-scale channel properties associated to a second channel of a second transmitter are provided. The method includes receiving a first signal transmitted by the first transmitter and further receiving at least a second signal transmitted by the second transmitter. The first and the second transmitter are synchronized to a common synchronization reference, and the first signal and/or the second signal includes at least one reference signal. The method further includes jointly estimating the first and second large-scale channel properties based on the at least one reference signal, and associating the jointly estimated large-scale channel properties to the first channel associated to the first transmitter and to the second channel associated to the second transmitter.

14 Claims, 8 Drawing Sheets

---

100

110 — Receiving first signal from first transmitter and second signal from second transmitter, the first and second transmitter synchronised to common synchronisation reference, the first and/or second signal comprising at least one reference signal 120 — Jointly estimating first and second large-scale properties based on at least one reference signal 130 — Associating jointly estimated large-scale properties to first channel associated to first transmitter and to second channel associated with second transmitter

(51) Int. Cl.
  *H04W 84/18* (2009.01)
  *H04L 25/03* (2006.01)
  *H04B 7/26* (2006.01)
  *H04W 84/12* (2009.01)

(52) U.S. Cl.
  CPC ..... *H04W 56/002* (2013.01); *H04W 56/0015* (2013.01); *H04W 84/18* (2013.01); *H04W 84/12* (2013.01)

(58) Field of Classification Search
  USPC .................................. 370/252–253, 310–350
  See application file for complete search history.

(56) References Cited

U.S. PATENT DOCUMENTS

| | | | |
|---|---|---|---|
| 9,106,276 B2* | 8/2015 | Sorrentino | H04B 7/024 |
| 2010/0040156 A1* | 2/2010 | Patel | H04L 5/0007 |
| | | | 375/260 |
| 2011/0173508 A1* | 7/2011 | Wehinger | H04L 1/1812 |
| | | | 714/748 |
| 2013/0064168 A1* | 3/2013 | Song | H04L 27/2611 |
| | | | 370/315 |
| 2013/0115988 A1* | 5/2013 | Sun | H04J 11/0056 |
| | | | 455/501 |
| 2013/0188558 A1 | 7/2013 | Nam et al. | |
| 2013/0194931 A1* | 8/2013 | Lee | H04L 5/0053 |
| | | | 370/241 |
| 2013/0201840 A1* | 8/2013 | Sorrentino | H04L 25/0204 |
| | | | 370/252 |
| 2013/0244676 A1 | 9/2013 | Koivisto et al. | |
| 2014/0025906 A1* | 1/2014 | Das Purkayastha | ......... |
| | | | G06F 12/0246 |
| | | | 711/155 |
| 2014/0036800 A1* | 2/2014 | Frenne | H04L 5/0035 |
| | | | 370/329 |
| 2015/0208391 A1* | 7/2015 | Park | H04L 5/0055 |
| | | | 370/329 |
| 2015/0341877 A1* | 11/2015 | Yi | H04W 56/00 |
| | | | 370/350 |
| 2015/0341882 A1* | 11/2015 | Davydov | H04W 88/08 |
| | | | 370/336 |

OTHER PUBLICATIONS

Tomatis et al. "Synchronization and Cell Search" *LTE—The UMTS Long Term Evolution: From Theory to Practice* Chapter 7 (Second Edition) pp. 151-163 (2011).
International Search Report, Application No. PCT/SE2013/051121, dated May 28, 2014.
Written Opinion of the International Searching Authority, Application No. PCT/SE2013/051121, dated May 28, 2014.
Huawei et al., "Discussion on antenna ports collocation", Agenda Item: 5, Document for: Discussion and decision, 3GPP TSG RAN WG1 Meeting #69, R1-122512, Prague, Czech Republic, May 21-25, 2012, 7 pp.
EP office action in application No. 13894224.8 dated Mar. 9, 2018.

* cited by examiner

RECEIVER AND METHOD FOR ESTIMATING LARGE-SCALE CHANNEL PROPERTIES

CROSS REFERENCE TO RELATED APPLICATION

This application is a 35 U.S.C. § 371 national stage application of PCT International Application No. PCT/SE2013/051121, filed on Sep. 27, 2013, the disclosure and content of which is incorporated by reference herein in its entirety. The above-referenced PCT International Application was published in the English language as International Publication No. WO 2015/047141 A1 on Apr. 2, 2015.

TECHNICAL FIELD

The present disclosure relates to communication between a transmitter and a receiver and in particular to estimating large-scale channel properties in order to enable communication between the transmitter and the receiver.

BACKGROUND

Device-to-device, D2D, communication is a well-known and widely used component of many existing wireless technologies, including ad hoc networks. Examples include Bluetooth and several variants of the Institute of Electrical and Electronics Engineers, IEEE, 802.11 standards suite such as WiFi Direct. These systems operate in unlicensed spectrum.

Recently, D2D communications as an underlay to cellular networks have been proposed as a means to take advantage of the proximity of communicating devices and at the same time to allow devices to operate in a controlled interference environment. Typically, it is suggested that such D2D communication shares the same spectrum as the cellular system, for example by reserving some of the cellular uplink resources for D2D purposes. Allocating dedicated spectrum for D2D purposes is a less likely alternative as spectrum is a scarce resource and (dynamic) sharing between the D2D services and cellular services is more flexible and provides higher spectrum efficiency.

Devices that want to communicate, or even just discover each other, typically need to transmit various forms of control signalling. One example of such control signalling is the so-called (discovery) beacon signal, which at least carries some form of identity and is transmitted by a device that wants to be discoverable by other devices. Other devices can scan for the beacon signal. Once they have detected the beacon, they can take the appropriate action, for example to try to initiate a connection setup with the device transmitting the beacon. For certain communication modes (e.g. connectionless communication, typically employed for groupcast and broadcast transmission) the beacon signal might carry a scheduling assignment indicating the associated data transmission to potential receivers. Connectionless communication is typically a unidirectional communication mode that does not require acknowledged connection setup. Other forms of control signalling may be carried by the beacon channel, too.

It may also be desirable to support D2D operation for out of network coverage User Equipments, UEs. In such case, different synchronisation options are possible: UEs may synchronise to a global reference (e.g. a Global Positioning System, GPS) which is in general different from the synchronisation reference of deployed networks. Possibly, UEs may operate in a fully asynchronous fashion (no synchronisation reference, at least for discovery). A further option is that clusters of UEs synchronise to a specific UE (in the following called a Cluster Head, CH) which provides local synchronisation to its neighbour UEs. Different clusters are not necessarily synchronised. It may further be desirable to support for inter-cell discovery scenarios where UEs camping on possibly unsynchronised cells are able to discover each other.

Additionally, operating D2D between different cells (that may happen to be unsynchronized or have large propagation delays) may require direct synchronization between the UEs participating in the D2D communication.

In order to detect possibly unsynchronised beacons and to perform channel estimation, each beacon is provided with DeModulation Reference Signals, DMRSs, if the radio transmission technology employs Long Term Evolution, LTE. DMRSs in each beacon are mapped to one or more OFDM symbols. Each DMRS is generated from a known sequence with good autocorrelation and cross correlation properties (e.g. such sequences are derived from Zaduff-Chu sequences).

Even though various options are possible, a possible solution for the mapping of beacons to the radio frames is to multiplex the beacons from different UEs in the frequency domain (Frequency Division Multiplex, FDM) within selected subframes.

Beacons are typically characterised by narrow bandwidth (e.g. 1 Physical Resource Block, PRB, corresponding to 12 subcarriers in LTE). Obtaining reliable estimation of the timing and Doppler shift associated to each beacon even at the low Signal to Noise Ratio, SNR, required for beacon detection implies a significant DMRS overhead in each beacon. Such overhead reduces the number of resource elements potentially allocated to the beacon's payload and consequently increase the beacons code-rate, affecting the coverage of the beacons.

SUMMARY

The object is to obviate at least some of the problems outlined above. In particular, it is an object to provide a receiver and a method performed by the receiver for estimating first large-scale channel properties associated to a first channel of a first transmitter and a second large-scale channel properties associated to a second channel of a second transmitter. These objects and others may be obtained by providing a receiver and a method performed by a receiver according to the independent claims attached below.

According to an aspect a method performed by a receiver for estimating first large-scale channel properties associated to a first channel of a first transmitter and a second large-scale channel properties associated to a second channel of a second transmitter is provided. The method comprises receiving a first signal transmitted by the first transmitter and further receiving at least a second signal transmitted by the second transmitter, wherein the first and the second transmitter are synchronised to a common synchronisation reference, and wherein the first signal and/or the second signal comprises at least one reference signal. The method further comprises jointly estimating the first and second large-scale channel properties based on the at least one reference signal; and associating the jointly estimated large-scale channel properties to the first channel associated to the first transmitter and to the second channel associated to the second transmitter.

According to an aspect, a receiver adapted for estimating first large-scale channel properties associated to a first channel to a first transmitter and a second large-scale channel properties associated to a second channel of a second transmitter. The receiver comprises a receiving unit adapted for receiving a first signal transmitted by the first transmitter and further for receiving at least a second signal transmitted by the second transmitter, wherein the first and the second transmitter are synchronised to a common synchronisation reference, and wherein the first signal and/or the second signal comprises at least one reference signal. The receiver further comprises an estimating unit adapted for jointly estimating the first and second large-scale channel properties based on the at least one reference signal; and an associating unit adapted for associating the jointly estimated large-scale channel properties to the first channel associated to the first transmitter and to the second channel associated to the second transmitter.

The receiver and the method performed by the receiver may have several advantages. A possible advantage is that the receiver may improve the estimation of large-scale channel properties associated with a received first signal by taking into account reference signals of other received signal(s) besides the received first signal. Another possible advantage is that a transmitter may not need to incorporate as many reference signals into a signal to be transmitted in order for the receiver to properly being able to estimate large-scale channel properties over the channel over which the signal to be transmitted.

BRIEF DESCRIPTION OF DRAWINGS

Embodiments will now be described in more detail in relation to the accompanying drawings, in which.

DETAILED DESCRIPTION

Briefly described, a receiver and a method performed by the receiver for estimating first large-scale channel properties associated to a first channel of a first transmitter and a second large-scale channel properties associated to a second channel of a second transmitter are provided. The method and the receiver make use of a received second signal from a second transmitter and jointly estimate first and second large-scale properties based on at least one reference signal comprised one or both of a received first signal and the second signal.

An exemplifying embodiment of such a method will now be described with reference to FIG. 1a, which is a flowchart of a method performed by the receiver for estimating first large-scale channel properties associated to a first channel of a first transmitter and a second large-scale channel properties associated to a second channel of a second transmitter, according to an exemplifying embodiment.

Figure 1A:
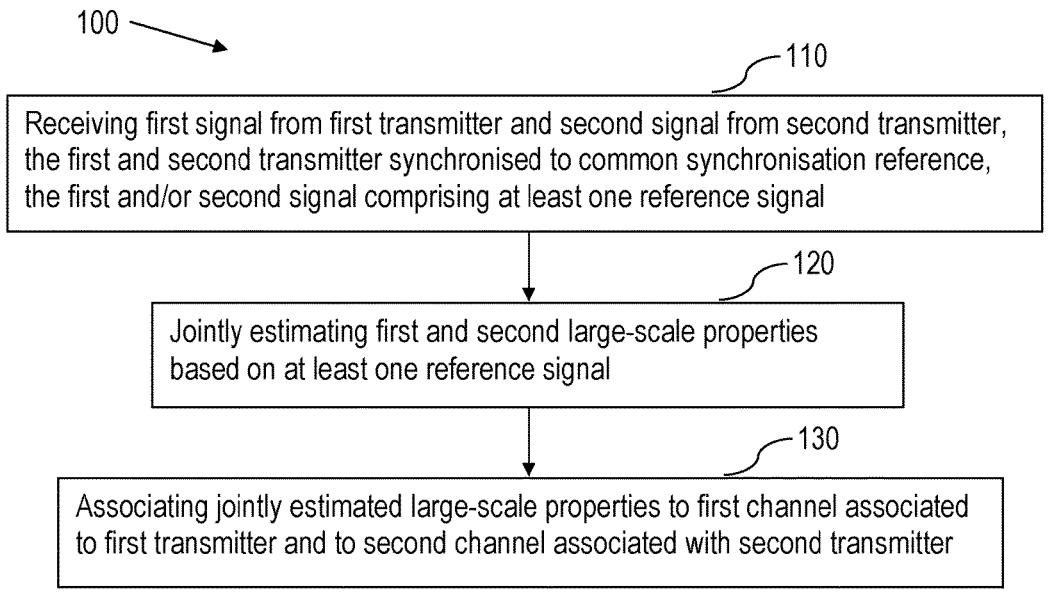
FIG. 1a is a flowchart of a method performed by the receiver for estimating first large-scale channel properties associated to a first channel of a first transmitter according to an exemplifying embodiment.

FIG. 1a illustrates the method comprising receiving 110 a first signal transmitted by the first transmitter and further receiving at least a second signal transmitted by the second transmitter, wherein the first and the second transmitter are synchronised to a common synchronisation reference, and wherein the first signal and/or the second signal comprises at least one reference signal. The method further comprises jointly estimating 120 the first and second large-scale channel properties based on the at least one reference signal; and associating 130 the jointly estimated large-scale channel properties to the first channel associated to the first transmitter and to the second channel associated to the second transmitter.

The receiver may receive signals transmitted from a plurality of transmitters. Each transmitter transmits signals over a respective channel. The receiver receives at least two signals, the first signal transmitted by the first transmitter and the second signal transmitted by the second transmitter over a first and a second channel respectively. The first and the second transmitter are synchronised to a common synchronisation reference. The receiver may receive signals from further transmitters not being synchronised to the common synchronisation reference, and if so, those signals may simply be discarded. By a common synchronisation reference means time and/or frequency alignment. The synchronisation reference may be provided by for example a radio base station, an eNode B, a base station controller, a radio network controller and so on. The synchronisation reference may also be provided by for example a transmitter, a receiver, a mobile station, a user equipment and so on.

It shall be pointed out that the receiver may also receive a third signal from a third transmitter over a third channel, a fourth signal from a fourth transmitter over a fourth channel and so on, wherein the third and the forth transmitter are synchronised to the same synchronisation reference as the first and the second transmitter. However, the exemplifying embodiment of the method will henceforth be described in association with only two transmitters. Further, channels refer to propagation channels (as compared to LTE terminology of "physical channels for data transmission etc.")

The first signal and/or the second signal comprises at least one reference signal.

The method also comprises jointly estimating the first and second large-scale channel properties based on the at least one reference signal. A couple of examples of large-scale channel properties are propagation delay and Doppler shift. Since both the first and the second transmitter are synchronised to a common synchronisation reference, certain large-scale properties of the first channel may be assumed to be similar to the large-scale properties of the second channel. For example, if both the first and the second signal comprise one respective reference signal, by jointly estimating the first and second large-scale channel properties based on the two reference signal, a more accurate estimation of the large-scale channel properties for both the first and the second channel may be obtained. In another example, if only one of the signals comprises one reference signal, e.g. the first signal, then the large-scale channel properties of the second channel may be estimated being the same or similar as the large-scale channel properties of the first channel since the first and the second transmitter are synchronised to a common synchronisation reference. Of course, both the first and the second signal may comprise more than one reference signal each, but at least one of the received first and second signal comprises at least one reference signal. In another example, even if both the first and the second signal comprise one respective reference signal, then the large-scale channel properties of the second channel may be estimated being the same or similar as the large-scale channel properties of the first channel since the first and the second transmitter are synchronised to a common synchronisation reference. In this way, the complexity of the channel estimation is reduced if only the reference signal corresponding to the first transmitter is employed for channel estimation of certain large-scale channel properties.

In general, channel estimation may be split into the steps of estimating certain large-scale channel properties, followed by the step of estimating the actual channel in time or frequency or other domain. The large-scale channel properties may be exploited, e.g., for optimizing the estimation parameters used for the estimation of the actual channel. With estimation of the actual channel it is intended here, e.g. estimation of the time domain channel taps if estimation is performed in time domain, or estimation of the frequency response if estimation is performed in the frequency domain.

The method further comprises associating the jointly estimated large-scale channel properties to the first channel associated to the first transmitter and to the second channel associated to the second transmitter.

In this manner, it is possible to e.g. minimise the number of reference signals of each signal since jointly estimating the first and second large-scale channel properties based on the at least one reference signal enables the receiver to estimate the large-scale channel properties for, e.g. the first channel, by also considering reference signals of other/another received signals/signal, all being sent by individual transmitters being synchronised to a common synchronisation reference. In fact, the reference signals may have additional design requirements in case they are intended to enable estimation of large-scale channel properties beyond estimation of the actual channel assuming that large-scale channel properties are known. Such additional design requirements may result in increased overhead and power consumption.

The method has several advantages. An advantage is that the receiver may improve the estimation of large-scale channel properties associated with a received first signal by taking into account reference signals of other received signal(s) besides the received first signal. Another advantage is that a transmitter may not need to incorporate as many reference signals into a signal to be transmitted in order for the receiver to properly being able to estimate large-scale channel properties over the channel over which the signal to be transmitted.

Figure 1B:
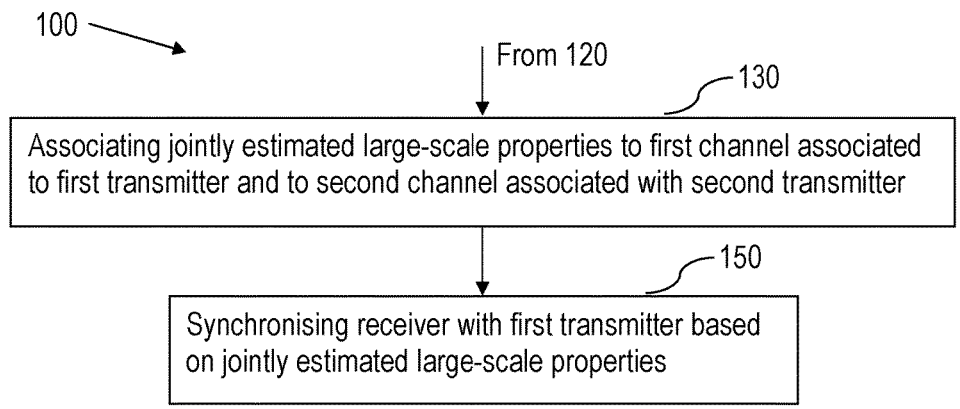
FIG. 1b is a flowchart of a method performed by the receiver for estimating first large-scale channel properties associated to a first channel of a first transmitter according to still an exemplifying embodiment.

According to an embodiment, illustrated in FIG. 1b, the method further comprises synchronising 150 the receiver with the first transmitter based on the associated jointly estimated large-scale channel properties.

Once the receiver has associated the jointly estimated large-scale channel properties to the first channel associated to the first transmitter and to the second channel associated to the second transmitter, the receiver synchronises itself with the first transmitter based on the associated jointly estimated large-scale channel properties. In this manner, the receiver and the first transmitter are enabled to communicate and the receiver may correctly receive signals transmitted by the transmitter since the receiver now knows e.g. the Doppler shift and/or average delay associated with the channel over which the transmitter and the receiver communicate.

Figure 1C:
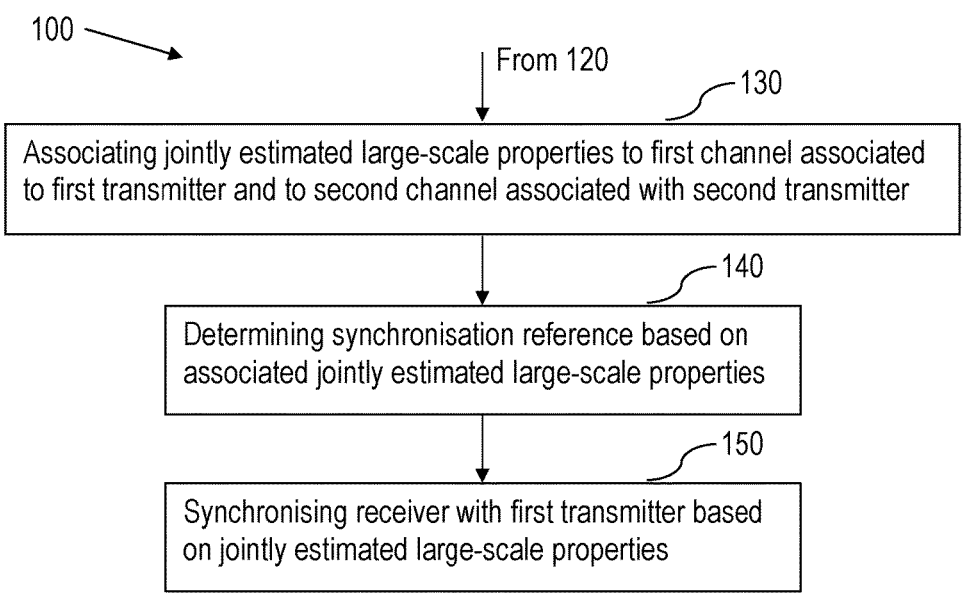
FIG. 1c is a flowchart of a method performed by the receiver for estimating first large-scale channel properties associated to a first channel of a first transmitter according to yet an exemplifying embodiment.

The method may further comprise, illustrated in FIG. 1c, determining 140 a synchronisation reference based on the associated jointly estimated large-scale channel properties.

In this manner, the receiver now knows the synchronisation reference which is the same as the common synchronisation reference.

According to an embodiment, the first and second large-scale channel properties include one or more of e.g. delay spread, Doppler spread, Doppler shift, average gain, average delay, and other large-scale channel properties.

The first and the second channel are dependent on the path between the respective transmitter and the receiver. If the first and the second transmitter are located at two individual locations, the respective path between the respective transmitter and the receiver may be different. Firstly, the distance between the first transmitter and the receiver may be different than the distance between the second transmitter and the receiver. Secondly, there may be different obstacles and/or surroundings in the path between the first transmitter and the receiver compared to in the path between the second transmitter and the receiver. Furthermore, the first and the second transmitter may have different reference timing and/or frequency reference. All these factors, and more factors not described, may affect the first and the second channel differently. Hence, the first signal transmitted from the first transmitter to the receiver may be subjected to different Doppler spread, Doppler Shift average gain and/or average delay compared to the second signal transmitted from the second transmitter to the receiver, especially if the two respective paths are very different. All these different factors are examples of large-scale channel properties. If the distance between the first transmitter and the receiver, and the distance between the second transmitter and the receiver are similar; and/or the path between the first transmitter and the receiver, and the path between the second transmitter and the receiver are similar; and if the first transmitter and the second transmitter are synchronized to the same synchronization reference in time and/or frequency, then the large-scale properties of the first channel may be similar to the large-scale properties of the second channel.

According to still an embodiment, synchronising 150 the receiver with the first transmitter comprises estimating timing and/or frequency synchronisation of the first signal.

When the receiver has jointly estimated the first and second large-scale channel properties based on the at least one reference signal, the receiver may estimate a difference in timing and/or frequency between itself and the first transmitter. Once the receiver has estimated the difference in timing and/or frequency, the receiver is enabled to synchronise itself with the first transmitter, i.e. it may align its transmission and/or reception parameters according to the reference timing.

According to yet an embodiment, joint channel estimates of said first and second large-scale channel properties are exploited to perform demodulation of data transmitted by the first and/or second transmitter.

Figure 2A:
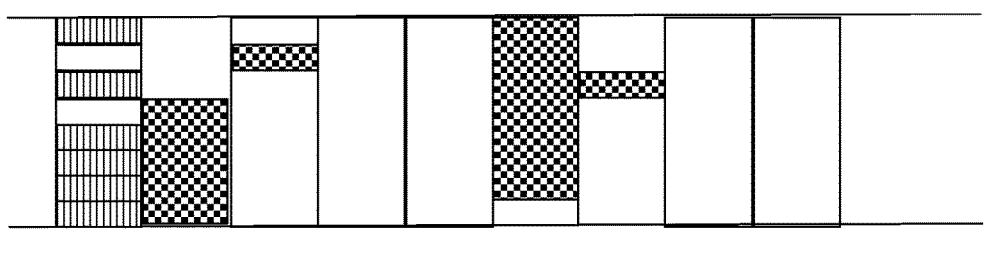
FIG. 2a is a schematic illustration of FDM mapping of discovery beacons/signals.

When the receiver subsequently receives a signal comprising data from the first and/or the second transmitter, the receiver needs to demodulate the received signal. The first and the second transmitter perform a modulation of some kind when transmitting signals. The receiver thus exploits the jointly estimated first and second large-scale channel properties in order to demodulate data transmitted by the first and/or second transmitter. The at least one reference signal comprised in at least one of the first and the second received signal used for jointly estimating the large-scale channel properties may be used to demodulate the subsequently received signal comprising data. A schematic illustration of this embodiment is illustrated in FIG. 2e.

According to an embodiment, the method further comprises determining that certain large-scale properties associated to certain signals are the same based on a pre-configuration, based on received signalling from a network or a transmitter, or based on an analysis of the received first and least second signal.

The receiver may be pre-configured with information pertaining to different channels, e.g. that certain large-scale properties associated to certain signals are the same. In this manner, estimation of large-scale channel properties of e.g. the first channel may be performed more accurately. Alternatively, or additionally, the receiver may receive signalling from a network to which the receiver is connected, or from e.g. the first or the second transmitter comprising information pertaining to different channels, e.g. that certain large-scale properties associated to certain signals are the same. Still further, the receiver may pre-analyse or pre-process the received signals and based on the pre-analysis or pre-analysis obtain the information pertaining to different channels, e.g. that certain large-scale properties associated to certain signals are the same.

The method may be employed by a receiver being able to receive signals transmitted by means of different transmission techniques. For example, the receiver may be able to receive signals transmitted by means of Orthogonal Frequency Division Multiplexing, OFDM, Time Division Multiplexing, TDM, and/or Code Division Multiplexing, CDM.

Both the transmitter and the receiver may be a type of User Equipment, UE, which in turn may be any of e.g. a mobile telephone, mobile station, laptop, personal digital assistant, or any other device or terminal being able to communicate by means of radio with another device or terminal.

Below follows an example of the receiver and transmitter being UEs being operable in a wireless communication system comprising of Radio Base Stations (RBSs) or eNodeB (eNBs) having respective coverage area also referred to as cells. In the example below, reference is also made to clusters. A cluster comprises UEs sharing a common synchronisation reference. Thus all UEs camping on the same cell, i.e. being connected to the same eNB or RBS, or belonging to the same cluster share a common synchronisation reference. The common synchronisation reference may be provided by the eNB or RBS, or by a UE of the cluster acting as a synchronisation reference. A UE of the cluster acting as a synchronisation reference is also referred to as a Cluster Head, CH. Further in the below example, the transmission technique is FDM, wherein the wireless communication system may be a Long Term Evolution, LTE, communication system. See also FIG. 2a.

Typical propagation delays within each cell or cluster are in the order of microseconds, while typical frequency errors (as compared to the eNB or UE carrier frequency) due to combinations of Doppler shift and synchronisation errors are in the order of hundredth of parts per million of the carrier frequency, i.e., hundreds of Hz. In order to achieve satisfactory performance, the UEs need to be able to synchronise within very few microseconds (i.e. less than the cyclic prefix length if the UEs are operable in an LTE communication system) and a few hundreds of Hz from their own synchronisation reference.

Different synchronisation references, however, may experience arbitrary synchronisation offsets in time (e.g. for unsynchronised Frequency Division Duplex, FDD, deployments and for different clusters) and/or in frequency (where different UEs acting as CHs may differ by thousands of Hz in carrier frequency). In order to be able to detect UEs camping on different cells or clusters, the receiving UEs need to be able to estimate and resolve potentially large timing/frequency offsets associated to the signals. Such estimation may be based on DeModulation Reference Signal, DMRS, for such signals.

It is observed here that the synchronisation offset associated to the UEs camping on a given cell or cluster is characterised by two components. (1) A large timing and/or frequency offset, due to the arbitrary synchronisation reference assumed by the eNB or CH. Such large offset is common to all UEs camping on the same cell/cluster. Typical offsets are in the order of milliseconds (time) or kHz (frequency). (2) A small timing and/or frequency offset, due to the UE-specific propagation delay and mobility and to the synchronisation error. Such offset is UE-specific. Typical offsets are in the order of microseconds (time) or hundreds of Hz (frequency).

When it comes to timing estimation, the reference bandwidth of a signal (e.g. 1 Physical Resource Block, PRB) is sufficient for obtaining a resolution of some microseconds at moderate Signal to Noise Ratio, SNR, values. However, due to, e.g. the occasional fading dips of the channel and occasional interference bursts, the receiver may occasionally not be able to estimate the timing within the desired accuracy.

A similar consideration to timing estimation can be drawn for frequency estimation, too. The frequency offset is typically obtained by estimating the phase rotation of the channel between two or more DMRSs transmitted in different OFDM symbols. As a general principle, close-by DMRSs allow a wide estimation range while widely spaced DMRSs allow for improved resolution, for a given SNR value. As an example, the estimation range by phase comparison of two consecutive DMRSs is given by $+/-1/(2 \, dT)$ where dT is the time spacing between the DMRSs. In order to estimate a frequency offset in the range of approximately $+/-7$ kHz (which is necessary for Device-to-Device, D2D, operations) the DMRSs need to be mapped to two consecutive OFDM symbols spaced ~72 us.

Therefore, spacing apart the DMRSs is by itself not a suitable solution for improving signal frequency estimation.

The performance of both timing and frequency estimation may be improved by increasing the number of DMRSs per signal, at the cost of overhead and reduced payload and signals' coverage.

Another example of how to improve estimation of large scale parameters for the signals (wherein propagation delay and Doppler shift are two examples of such parameters) is to let the UEs transmit a reliable dedicated synchronisation signal which is not directly associated to data transmission, differently, e.g. from DMRS. Such synchronisation signals may have different bandwidth and periodicity than the DMRSs and corresponding data regions and as such may be more suitable for synchronisation purposes. Each UE may transmit its individual synchronisation signal, with specific signal sequence and identity, or multiple UEs (e.g. all UEs sharing the same synchronisation reference) may transmit the same synchronisation signal over shared radio resources. In the latter case, multiple identical synchronisation signals are transmitted in an overlapping fashion over a predefined set of radio resources. Assuming that the receivers are aware of the association between synchronisation signals and other signals, certain large scale channel properties (e.g. propagation delay and Doppler shift) may be assumed as Quasi Co-Located, QCL, between the radio channels associated to the synchronisation signals and the other signals. In such case, the receiver would be able to estimate such large scale channel properties from the synchronisation signals (i.e. perform time and/or frequency synchronisation) and apply such synchronisation to the other signals. The actual channels associated to the other signals would be instead estimated from the signals' DMRS, since such properties would not be QCL with other reference signals such as synchronisation signals. Such QCL assumptions would ease channel estimation based on signals DMRS and possibly allow for overhead reduction in the signals, thanks to reliable synchronisation based on dedicated synchronisation signals.

Antenna Ports QCL is a framework first introduced in $3^{rd}$ Partnership Project, 3 GPP, LTE Release-11 in the context of Downlink, DL, Coordinated Multi Point, CoMP. In DL CoMP, different signals and channels targeting a given UE may be transmitted from spatially separated antennas in the network (antenna ports) and are thus associated to different propagation radio channels. It should be noted that transmitter's non idealities are included in the equivalent channel. Geographical separation of Reference Signal, RS, ports implies that instantaneous channel coefficients from each port towards the UE are in general different. Furthermore, even the statistical properties of the channels (sometimes equivalently termed as "long term channel properties" or "large scale channel properties") for different ports and RS types may be significantly different. Example of such statistical properties include the received power for each port, the delay spread, the Doppler spread, the received timing (i.e. the timing of the first significant channel tap), the number of significant channel taps, the frequency shift. In LTE, nothing can be assumed about the properties of the channel corresponding to an antenna port based on the properties of the channel of another antenna port. This is in fact a key part of maintaining transmission transparency.

Certain antenna ports may be associated to the same (i.e. substantially similar) large scale channel properties. In such case, it is said that given antenna ports are quasi co-located with respect to certain large scale channel properties. In general, for each couple of RS ports and at a given time, the following two conditions may be possible. (1) Ports A and B may be assumed (by the UE) as QCL with respect to large scale property X. (2) Ports A and B shall not be assumed (by the UE) as QCL with respect to large scale property X The method disclosed above allows for improved signals' synchronisation for a given DMRS overhead per signal. An assumption is that multiple signals are often transmitted within the same cell or clusters by multiple UEs. These concurrent transmissions may happen within the same subframe (as in the FDM case considered as baseline in this description) as well as in TDM or CDM fashion, without affecting the applicability of the method or the receiver performing the method.

The QCL assumptions described here can be readily extended to any signal and/or channel transmitted by the UEs including, e.g. direct data channels and discovery channels transmitted by UEs for D2D purpose and associated to the same synchronisation reference as the signals and/or synchronisation signals.

The receiver (or receiving UE) estimates timing and/or frequency synchronisation for a given signal based on the received DMRS associated to multiple signals. The signals to be jointly processed may be selected based on information that such signals are associated to UEs camping on the same cell or cluster and as such have common synchronisation reference. Additionally, one or multiple synchronisation reference signals which may be transmitted by one or multiple UEs sharing the same synchronisation reference may be exploited in the joint estimation. The estimation algorithm jointly processes the signals corresponding to DMRS transmitted by the multiple UEs in the respective multiple signals. It is observed that the receiver is not necessarily a-priori aware of the actual presence of a transmitted signal on the resources used for estimation. Possibly, some DMRS signals may only include noise or interference, in case the intended signal is not transmitted. The estimated synchronisation reference or large scale channel properties may be exploited as input parameter of a channel estimation algorithm for the signals.

The above example allows the receiver to exploit multiple DMRSs for estimation of parameters that are common (within a certain range or accuracy) to all the signals transmitted by UEs within a cell/cluster. The fine estimation of the large scale channel properties may be obtained by refining the joint estimation based on multiple signals with an estimation based on the DMRS associated to each signal.

A practical example occurs with FDM mapping of signals. In this case the receiver knows that with high probability several signals are multiplexed in the same subframe and at least coarse time and/or frequency synchronisation may be achieved jointly for multiple beacon resources within the same subframe, thus exploiting multiple DMRS.

An equivalent way of formulating the above example is to state that the receiver UE may assume QCL among certain large scale channel properties associated to the antenna ports used to convey the signals and possibly other reference signals associated to UEs with the same synchronisation reference. Such channel properties may be one or more of, e.g. delay spread, Doppler spread, Doppler shift, average gain, and average delay.

In order to enable joint estimation of synchronization parameters as discussed in embodiments above, the receiver may take advantage of knowledge of the parameters relevant for signals comprising DMRS associated to the signals to be potentially jointly processed. Such parameters may comprise, e.g., the mapping of DMRS to the time/frequency resources in the subframe for each signal and synchronisation signals and the sequences used for each DMRS and synchronisation signal.

By defining such parameters for all signals according, e.g. to the standard or some signalling, the receiver does not need to blindly search for all or multiple possible combinations of DMRS sequences, synchronisation sequences and their mappings. At the same time, providing a predefined mapping of the RS parameters allows to differentiate the DMRS parameters in different beacons, with advantages in terms of joint estimation performance and interference randomisation. In one example, the DMRS sequences are a function of at least the resource index (e.g. a PRB index) in which the corresponding signal is transmitted. In a further example, the DMRS mapping parameters (e.g. a DMRS symbols index) are a function of at least the resource index (e.g. the PRB index) in which the corresponding signal is transmitted.

Figure 2B:
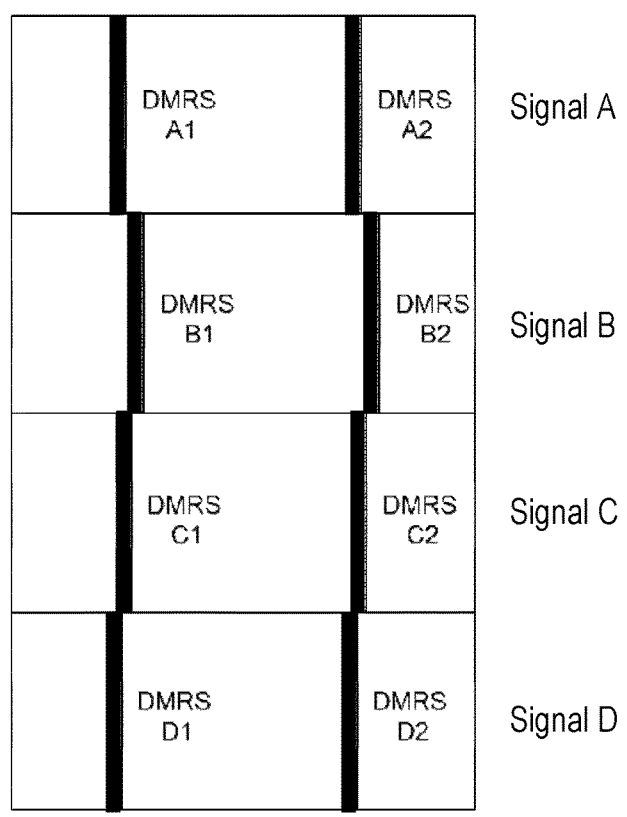
FIG. 2b is an example of DMRS resource mapping as a function of signal resource index.
Figure 2C:
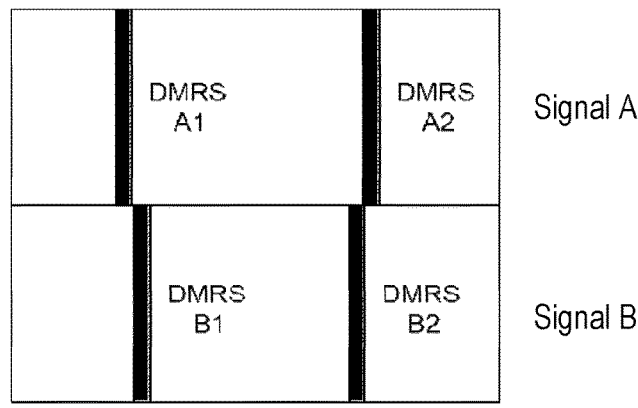
FIG. 2c is still an example of DMRS resource mapping as a function of signal resource index.
Figure 2D:
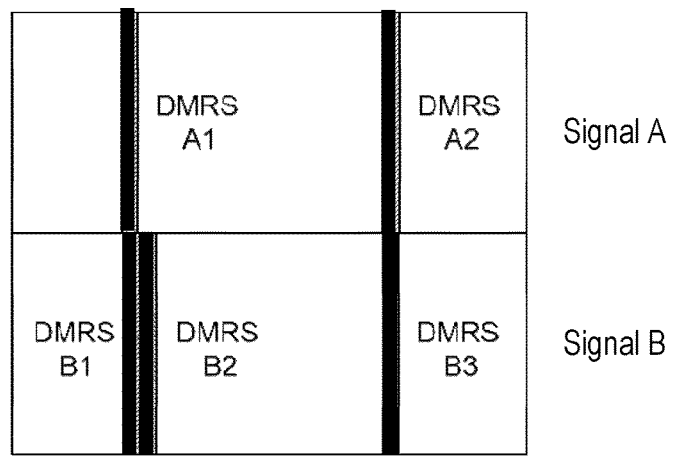
FIG. 2d is yet an example of DMRS resource mapping as a function of signal resource index.
Figure 2E:
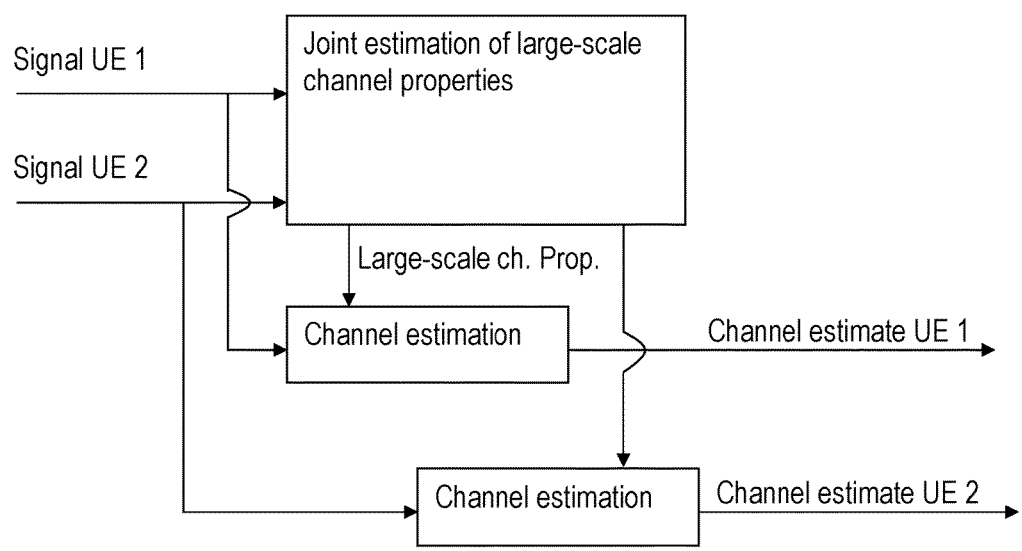
FIG. 2e is a block diagram schematically illustrating joint estimation of large-scale channel properties.

FIGS. 2b, 2c and 2d provide examples of DMRS resource mapping as a function of signal resource index. In FIGS. 2b and 2c, coarse frequency estimation may be obtained by, e.g. comparing the phases of DMRS {A1, B1, A2, B2}, which are pair-wise closely spaced in time and have thus wide frequency estimation range but poor accuracy. Similarly, coarse timing estimation may be obtained by jointly considering {A1, B1, A2, B2}. After coarse time and frequency estimation, the estimation accuracy may be further increased, if desired, by estimating signal A's timing and frequency based on A1,A2 and signal B's timing and frequency based on B1,B2.

In a further example, the DMRS sequences and/or mapping are a function of at least the cell ID or the cluster identity and/or the system bandwidth or other parameters associated to the signal.

Embodiments herein also relate to a receiver adapted for estimating first large-scale channel properties associated to a first channel of a first transmitter and a second large-scale channel properties associated to a second channel of a second transmitter.

Figure 3:
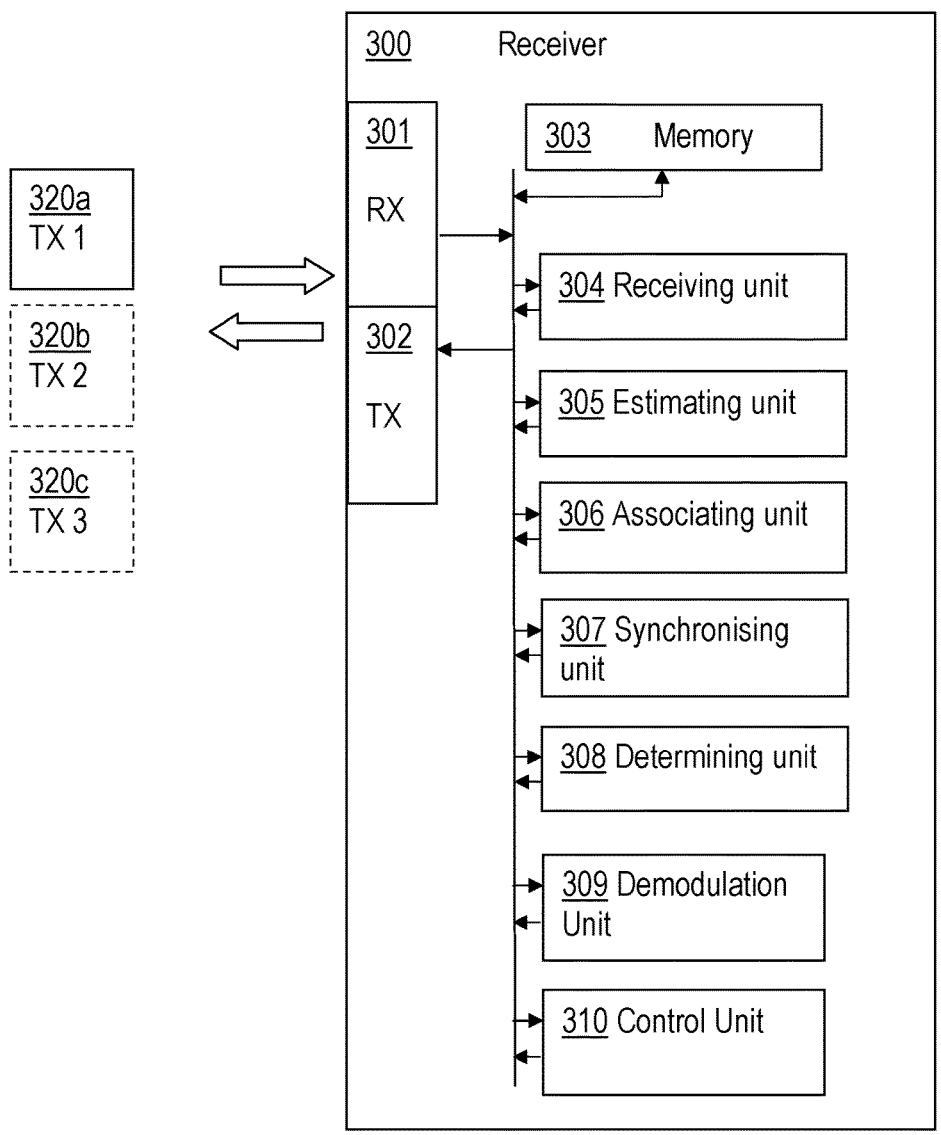
FIG. 3 is a block diagram of a receiver adapted for estimating first large-scale channel properties associated to a first channel of a first transmitter according to an exemplifying embodiment.

Exemplifying embodiments of such a receiver will now be described with reference to FIG. 3. FIG. 3 is a block diagram of a receiver adapted for estimating first large-scale channel properties associated to a first channel to a first transmitter and a second large-scale channel properties associated to a second channel of a second transmitter according to an exemplifying embodiment.

FIG. 3 illustrates the receiver 300 comprising a receiving unit 304 adapted for receiving a first signal transmitted by the first transmitter 320a and further for receiving at least a second signal transmitted by the second transmitter 320b, wherein the first and the second transmitter are synchronised to a common synchronisation reference, and wherein the first signal and/or the second signal comprises at least one reference signal. The receiver 300 further comprises an estimating unit 305 adapted for jointly estimating the first and second large-scale channel properties based on the at least one reference signal; and an associating unit 306 adapted for associating the jointly estimated large-scale channel properties to the first channel associated to the first transmitter 320a and to the second channel associated to the second transmitter 320b.

The receiver has the same advantages as the method performed by the receiver. An advantage is that the receiver may improve the estimation of large-scale channel properties associated with a received first signal by taking into account reference signals of other received signal(s) besides the received first signal. Another advantage is that a transmitter may not need to incorporate as many reference signals into a signal to be transmitted in order for the receiver to properly being able to estimate large-scale channel properties associated with the signal to be transmitted.

According to an embodiment, the receiver 300 further comprises a synchronising unit 307 adapted for synchronising the receiver 300 with the first transmitter 320a based on the associated jointly estimated large-scale channel properties.

According to still an embodiment, the receiver 300 further comprises a determining unit 308 adapted for determining a synchronisation reference based on the associated jointly estimated large-scale channel properties.

According to yet an embodiment, the first and second large-scale channel properties include one or more of delay spread, Doppler spread, Doppler shift, average gain, and average delay.

According to an embodiment, the estimating unit 305 further is adapted for estimating timing and/or frequency synchronisation of the first signal in order for the synchronising unit 307 to synchronise the receiver 300 with the first transmitter 320a.

According to still an embodiment, the receiver 300 further comprises a demodulation unit 309 adapted for demodulating data transmitted by the first and/or second transmitter 320a, 320b by exploiting the joint channel estimates of said first and second large-scale channel properties.

According to yet an embodiment, the determining unit 308 further is adapted for determining that certain large-scale properties associated to certain signals are the same based on a pre-configuration, based on received signalling from a network or a transmitter, or based on an analysis of the received first and least second signal.

In FIG. 3, the receiver 300 is also illustrated comprising a receiving arrangement 301 and a transmitting arrangement 302. Through these two arrangements, the receiver 300 is adapted to communicate with other nodes and/or entities in the wireless communication network. The receiving arrangement 301 may comprise more than one receiving arrangement. For example, the receiving arrangement may be connected to both a wire and an antenna, by means of which the receiver 300 is enabled to communicate with other nodes and/or entities in the wireless communication network. Similarly, the transmitting arrangement 302 may comprise more than one transmitting arrangement, which in turn are connected to both a wire and an antenna, by means of which the receiver 300 is enabled to communicate with other nodes and/or entities in the wireless communication network. The receiver 300 further comprises a memory 303 for storing data. Further, the receiver 300 is illustrated comprising a control or processing unit 310 which in turns is connected to the different units 304-309. It shall be pointed out that this is merely an illustrative example and the receiver 300 may comprise more, less or other units or modules which execute the functions of the receiver 300 in the same manner as the units illustrated in FIG. 3.

It should be noted that FIG. 3 merely illustrates various functional units in the receiver 300 in a logical sense. The functions in practice may be implemented using any suitable software and hardware means/circuits etc. Thus, the embodiments are generally not limited to the shown structures of the receiver 300 and the functional units. Hence, the previously described exemplary embodiments may be realised in many ways. For example, one embodiment includes a computer-readable medium having instructions stored thereon that are executable by the control or processing unit 310 for executing the method steps in the receiver 300. The instructions executable by the computing system and stored on the computer-readable medium perform the method steps of the receiver 300 as set forth in the claims.

Figure 4:
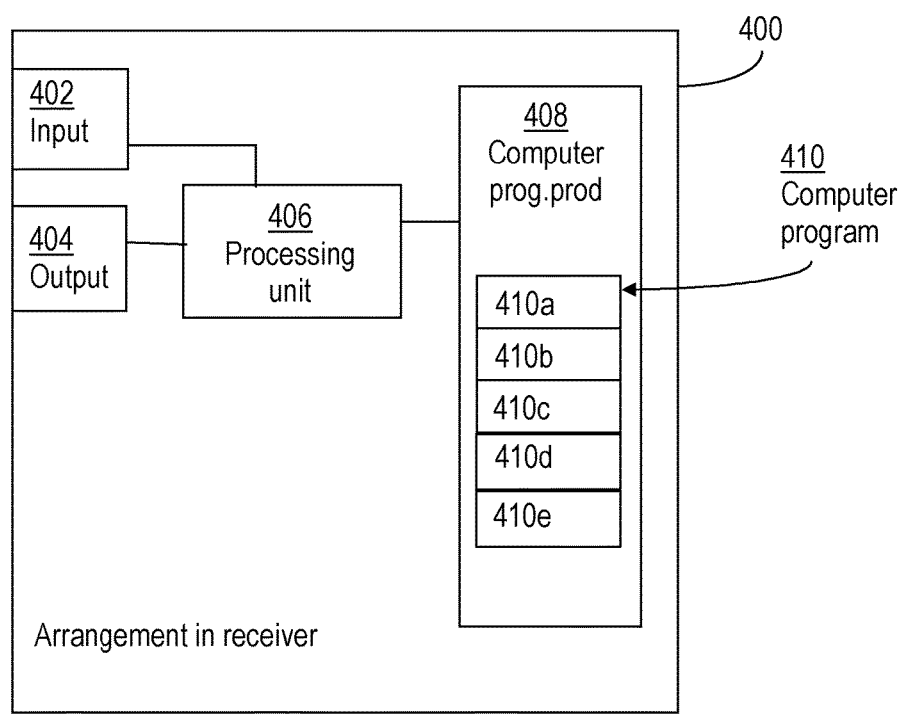
FIG. 4 is a block diagram of an arrangement of a receiver adapted for estimating first large-scale channel properties associated to a first channel of a first transmitter according to an exemplifying embodiment.

FIG. 4 schematically shows an embodiment of an arrangement in a receiver 400. Comprised in the receiver 400 are here a processing unit 406, e.g. with a DSP (Digital Signal Processor). The processing unit 406 may be a single unit or a plurality of units to perform different actions of procedures described herein. The receiver 400 may also comprise an input unit 402 for receiving signals from other entities, and an output unit 404 for providing signal(s) to other entities. The input unit and the output unit may be arranged as an integrated entity or as illustrated in the example of FIG. 3, as one or more interfaces 301/302.

Furthermore, the receiver 400 comprises at least one computer program product 408 in the form of a non-volatile memory, e.g. an EEPROM (Electrically Erasable Programmable Read-Only Memory), a flash memory and a hard drive. The computer program product 408 comprises a computer program 410, which comprises code means, which when executed in the processing unit 406 in the receiver 400 causes the receiver 400 to perform the actions e.g. of the procedure described earlier in conjunction with FIGS. 1a-1c.

The computer program 410 may be configured as a computer program code structured in computer program modules 410a-410e. Hence, in an exemplifying embodiment, the code means in the computer program of the receiver 400 comprises a receiving unit, or module, for receiving a first signal transmitted by the first transmitter and further receiving at least a second signal transmitted by the second transmitter, wherein the first and the second transmitter are synchronised to a common synchronisation reference, and wherein the first signal and/or the second signal comprises at least one reference signal. The computer program further comprises an estimating unit, or module, for jointly estimating the first and second large-scale channel properties based on the at least one reference signal. The computer program further comprises an assigning unit, or module, for assigning the jointly estimated large-scale channel properties to the first channel associated to the first transmitter and to the second channel associated to the second transmitter.

The computer program modules could essentially perform the actions of the flow illustrated in FIGS. 1a-1c, to emulate the receiver 400. In other words, when the different computer program modules are executed in the processing unit 406, they may correspond to the units 304-309 of FIG. 3.

Although the code means in the embodiments disclosed above in conjunction with FIG. 3 are implemented as computer program modules which when executed in the respective processing unit causes the receiver to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the receiver.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a receiver for estimating first large-scale channel properties associated to a first channel of a first transmitter and second large-scale channel properties associated to a second channel of a second transmitter, the method comprising:
   receiving a first signal transmitted by the first transmitter and further receiving at least a second signal transmitted by the second transmitter, wherein the first transmitter and the second transmitter are synchronised to a common synchronisation reference, and wherein the first signal comprises a first reference signal and the second signal comprises a second reference signal;
   jointly estimating the first large-scale channel properties and the second large-scale channel properties based only on the first reference signal; and
   associating the jointly estimated large-scale channel properties to the first channel associated to the first transmitter and to the second channel associated to the second transmitter,
   wherein the associated jointly estimated large-scale channel properties are exploited to perform demodulation of data transmitted by the first transmitter and the second transmitter, and wherein the demodulation of the data transmitted by the first transmitter and the second transmitter is performed using the first reference signal.

2. The method according to claim 1, further comprising synchronizing the receiver with the first transmitter based on the associated jointly estimated large-scale channel properties.

3. The method according to claim 2, further comprising determining a synchronisation reference based on the associated jointly estimated large-scale channel properties.

4. The method according to claim 1, wherein the first large-scale channel properties and the second large-scale channel properties include one or more of: delay spread, Doppler spread, Doppler shift, average gain, and average delay.

5. The method according to claim 2, wherein synchronising the receiver with the first transmitter comprises estimating timing and/or frequency synchronisation of the first signal.

6. The method according to claim 1, further comprising determining that certain large-scale properties associated to certain signals are the same based on a pre-configuration, based on received signalling from a network or a transmitter, or based on an analysis of the received first signal and the received second signal.

7. The method of claim 1, further comprising: discarding signals received from transmitters not synchronized to the common synchronization reference.

8. A receiver adapted to estimate first large-scale channel properties associated to a first channel of a first transmitter and second large-scale channel properties associated to a second channel of a second transmitter, the receiver comprising:
   a receiving unit adapted to receive a first signal transmitted by the first transmitter and further to receive at least a second signal transmitted by the second transmitter, wherein the first transmitter and the second transmitter are synchronised to a common synchronisation reference, and wherein the first signal comprises a first reference signal and the second signal comprises a second reference signal;

an estimating unit adapted to jointly estimate the first large-scale channel properties and the second large-scale channel properties based only on the first reference signal;

an associating unit adapted to associate the jointly estimated large-scale channel properties to the first channel associated to the first transmitter and to the second channel associated to the second transmitter; and a demodulation unit adapted to exploit the associated jointly estimated large-scale channel properties to perform demodulation of data transmitted by the first transmitter and the second transmitter, wherein the demodulation of the data transmitted by the first transmitter and the second transmitter is performed using the first reference signal.

9. The receiver according to claim 8, further comprising a synchronising unit adapted to synchronise the receiver with the first transmitter based on the associated jointly estimated large-scale channel properties.

10. The receiver according to claim 9, further comprising a determining unit adapted to determine a synchronisation reference based on the associated jointly estimated large-scale channel properties.

11. The receiver according to claim 8, wherein the first large-scale channel properties and the second large-scale channel properties include one or more of: delay spread, Doppler spread, Doppler shift, average gain, and average delay.

12. The receiver according to claim 9, wherein the estimating unit is further adapted to estimate timing and/or frequency synchronisation of the first signal in order for the synchronising unit to synchronise the receiver with the first transmitter.

13. The receiver according to claim 8, wherein the determining unit is further adapted to determine that certain large-scale properties associated to certain signals are the same based on a pre-configuration, based on received signalling from a network or a transmitter, or based on an analysis of the received first signal and the received second signal.

14. A computer program product comprising a non-transitory computer readable storage medium storing program code, which when executed by a processor of a receiver causes the receiver to perform the corresponding method according to claim 1.

* * * * *